US008605053B2

United States Patent
Murphy et al.

(10) Patent No.: US 8,605,053 B2
(45) Date of Patent: Dec. 10, 2013

(54) METHOD AND DEVICE FOR DETECTING USER INPUT

(75) Inventors: Mark J. Murphy, Kilmore (IE); Eoin Edward English, Pallasgreen (IE); Eoghan Moloney, Raheen (IE); Mel Conway, Broadford (IE); Gary Casey, Raheen (IE); Krystian Balicki, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 358 days.

(21) Appl. No.: 12/708,927

(22) Filed: Feb. 19, 2010

(65) Prior Publication Data
US 2011/0128250 A1    Jun. 2, 2011

Related U.S. Application Data

(63) Continuation-in-part of application No. 12/629,658, filed on Dec. 2, 2009, now abandoned.

(51) Int. Cl.
*G06F 3/045*    (2006.01)

(52) U.S. Cl.
USPC ........... 345/174; 345/156; 345/173; 345/632; 178/18.04; 178/18.06; 310/319; 310/338; 715/701; 715/702; 341/27

(58) Field of Classification Search
USPC ......... 345/156–158, 161–167, 173–179, 632; 178/18.04–18.06; 310/319, 316.01, 310/338; 341/20, 27; 715/701–702
See application file for complete search history.

(56) References Cited

U.S. PATENT DOCUMENTS

| | | | |
|---|---|---|---|
| 7,336,260 B2 | 2/2008 | Martin et al. | |
| 7,639,232 B2 | 12/2009 | Grant et al. | |
| 2003/0067440 A1* | 4/2003 | Rank | 345/156 |
| 2008/0024459 A1* | 1/2008 | Poupyrev et al. | 345/173 |
| 2008/0150911 A1* | 6/2008 | Harrison | 345/173 |
| 2008/0294984 A1* | 11/2008 | Ramsay et al. | 715/702 |
| 2009/0146533 A1* | 6/2009 | Leskinen et al. | 310/338 |
| 2009/0228791 A1 | 9/2009 | Kim et al. | |
| 2009/0267902 A1 | 10/2009 | Nambu et al. | |
| 2010/0295559 A1* | 11/2010 | Osoinach | 324/658 |

FOREIGN PATENT DOCUMENTS

WO    2006042309    4/2006

OTHER PUBLICATIONS

PCT International Search Report for PCT/US2011/020355 mailed on Mar. 11, 2011.

* cited by examiner

*Primary Examiner* — Lun-Yi Lao
*Assistant Examiner* — Md Saiful A Siddiqui
(74) *Attorney, Agent, or Firm* — Kenyon & Kenyon LLP

(57) ABSTRACT

A method and a device for detecting user input includes receiving a user input at an input arrangement of a user interface. The input arrangement has at least one piezoelectric sensor that generates an electric signal in response to the input. The electric signal is processed to determine the presence of the input. The processing may indicate the magnitude of the force of the input, in addition to the input's location. An output arrangement of the user interface generates an output in response to the processing. The output may be a haptic, audio or visual output.

21 Claims, 7 Drawing Sheets

METHOD AND DEVICE FOR DETECTING USER INPUT

CROSS-REFERENCE TO RELATED APPLICATIONS

This application is a continuation-in-part of U.S. patent application Ser. No. 12/629,658 which was filed on Dec. 2, 2009 now abandoned. This application claims priority to U.S. patent application Ser. No. 12/629,658 and to U.S. patent application Ser. No. 12/629,629 which was filed on Dec. 2, 2009. The contents of these applications are incorporated herein by reference in their entirety.

BACKGROUND INFORMATION

User interfaces receive user input and process the user input to provide for interaction between a user and a machine. On some user interfaces, the input mechanism provides direct mechanical feedback to the user. For example, a specific amount of force is required to depress a mechanical button. The button also springs back with a specific amount of force when released, and the user can feel the spring-back force. On other user interfaces, such as touchscreens, the input mechanism does not provide direct mechanical feedback. In a typical touchscreen, the input mechanism is a hard glass or plastic surface that does not yield to pressures associated with touch input. Therefore, a separate mechanical feedback mechanism may be provided.

In addition to providing mechanical feedback, user interfaces often provide visual or audio feedback. For example, on a touchscreen, the display may show an input-confirming image such as a highlighted menu option. Conventional user interfaces often fail to provide an optimal feedback response to the user. If the feedback mechanism generates a uniform response to different inputs, e.g., vibrating in the same manner each time a button is pressed, then the user cannot rely on the feedback mechanism alone to distinguish one input from another because the response is not specific enough. Failure may also occur when the feedback takes too long to reach the user, i.e., feedback latency.

SUMMARY

According to example embodiments of the present invention, a method of detecting a force-producing input from a user includes the steps of receiving the input at an input arrangement of a user interface, wherein the input arrangement has at least one piezoelectric sensor to detect a force producing input from a human or other operator; and generating, via the same or an additional piezoelectric element, a force or moment at a specific point of the operator in response to the input. The method further includes processing the electric signal to determine a presence of the input; and generating, at an output arrangement of the user interface, an output in response to the processing.

According to example embodiments of the present invention, a device for detecting a force-producing input from a user includes a user interface and a control module. The user interface includes an input arrangement having at least one piezoelectric sensor configured to generate an electric signal in response to the input, and an output arrangement. The control module receives the electric signal and is configured to process the electric signal, thereby determining the presence of the input. The output arrangement is configured to generate an output in response to the processing.

According to example embodiments of the present invention, a device for detecting a force-producing input from a user includes a user interface and a control module. The user interface includes an input/output arrangement with at least one piezoelectric element configured to generate an electric signal in response to the input. The control module receives the electric signal and is configured to process the electric signal, thereby determining the presence of the input. The at least one piezoelectric element is configured to generate an output in response to the processing.

According to example embodiments of the present invention, a control module is configured to detect a force-producing input from a user by performing the following: receiving an electric signal from at least one piezoelectric sensor located at an input arrangement of a user interface, wherein the electric signal is generated in response to the input; processing the electric signal to determine the presence of the input; and controlling an output arrangement of the user interface to generate an output in response to the processing.

DETAILED DESCRIPTION

The present invention relates to methods and devices for detecting user input. In an example embodiment of the present invention, a device for detecting user input includes a touchscreen display for both receiving user input and providing an output responsive to the user input. However, the present invention may be implemented with other types of user interfaces, e.g., mechanical keypads and keyboards.

Figure 1:
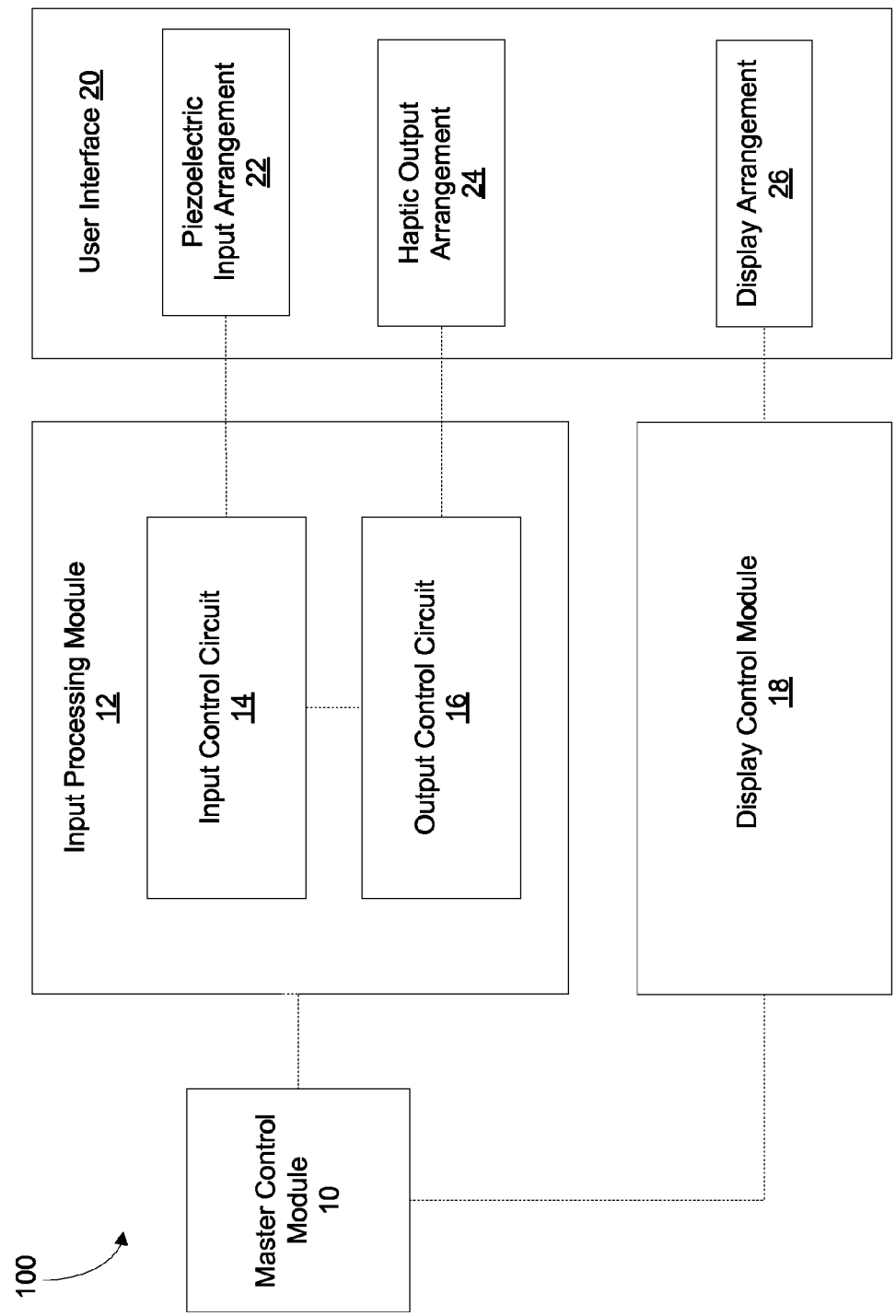
FIG. 1 is a block diagram that shows an arrangement for detecting user input according to an example embodiment of the present invention.

FIG. 1. shows an arrangement 100 for detecting user input according to an example embodiment of the present invention. The arrangement 100 may be located on a portable user device such as a cell phone, a laptop computer or a multimedia player. The arrangement 100 may alternatively be located on a non-portable user device such as an automated teller machine, an office copier or a public kiosk. The arrangement 100 may include a master control module 10, an input processing module 12, a display control module 18 and a user interface 20. In an example embodiment, the arrangement 100 is hardware-implemented, but may also include software-implemented components. For example, the master control module 10 may be implemented using a combination of hardware and software, while the input processing module 12 may be entirely hardware-implemented. Other hardware-software combinations are possible.

The master control module 10 may be coupled to the input processing module 12 and the display control module 18, and may include a processor executing instructions such as operating system instructions that control the operation of the device on which the arrangement 100 is located. For instance, the instructions may direct the processor to provide an interactive menu on the user interface 20. Based on the menu, the user may provide the user input, e.g., selecting a menu item by pressing a virtual button.

The user interface 20 may include a piezoelectric input arrangement 22, a haptic output arrangement 24 and a display arrangement 26. The piezoelectric input arrangement 22 includes at least one piezoelectric sensor, which generates a voltage in response to the application of a mechanical force, such as that produced by the user input, upon a surface of the piezoelectric sensor. The generation of a voltage in response to a force is known as the piezoelectric effect. In an alternative embodiment, the methods and devices of the present invention may be modified for implementation with force-resistive sensors. However, piezoelectric sensors may be preferable because a driving voltage is not required for sensing, whereas force-resistive sensors typically require a driving voltage.

The haptic output arrangement 24 may be configured to provide a response to the user input. Haptic output may include any number of physical responses such as vibrations, material deformation, temperature changes, etc. Accordingly, the haptic output arrangement 24 may include an actuator generating a haptic output. For example, the actuator may be an electromagnetic-stepper motor, eccentric rotating mass, linear resonant actuator, a voice coil motor, a loudspeaker, a heater, etc. In one embodiment, the actuator may be piezoelectric, i.e., a circuit element activated via the inverse piezoelectric effect, which occurs when a voltage is applied to the piezoelectric element. When the voltage is applied, the piezoelectric element undergoes a mechanical deformation, e.g., contraction or expansion. The deformation may then be used to produce the haptic output by, for example, coupling the piezoelectric deformation to the touchscreen, or a phone body, which in turn is detectable by the user, e.g., a human operator, as a haptic response to input from the operator.

The display arrangement 26 may be implemented using one of any number of conventional display technologies. For example, the display arrangement 26 may include a liquid crystal display, a plasma display, an electrophoretic display, etc. In an example embodiment where the master control module 10 is configured to provide an interactive menu, the menu may be displayed at the display arrangement 26, which may also display additional images or information as directed by the master control module 10.

The display control module 18 may be coupled to the master control module 10 to receive instructions and/or data relating to an image to be displayed at the display arrangement 26. A coupling between the display control module 18 and the display arrangement 26 may allow the instructions/data from the master control module 10 to be relayed to the display arrangement 26, e.g., as a set of display control signals. In one embodiment, the display control module 18 may generate the display control signals by converting pixel information, e.g., RGB or CMYK values, into a format suitable for driving the display arrangement 26.

The input processing module 12 may include an input control circuit 14 and an output control circuit 16. The input control circuit 14 may be coupled to the piezoelectric input arrangement 22. The output control circuit may be coupled to the haptic output arrangement 24. The control circuits 14/16 may be in direct communication with each other, i.e., directly coupled. The input control circuit 14 may include hardware for processing an output of the piezoelectric input arrangement 22. Based on the processing, the input control circuit 14 may provide the output control circuit 16 with instructions and/or data for generating a haptic output at the haptic output arrangement 24.

Although the input control circuit 14 and the output control circuit 16 are shown as separate components, it will be understood that the division is purely conceptual so the input control circuit 14 and the output control circuit 16 may be implemented as a single device. For example, both circuits 14/16 may form a hardware-implemented logic unit, e.g., an integrated circuit, a programmable processor, etc.

Figure 2:
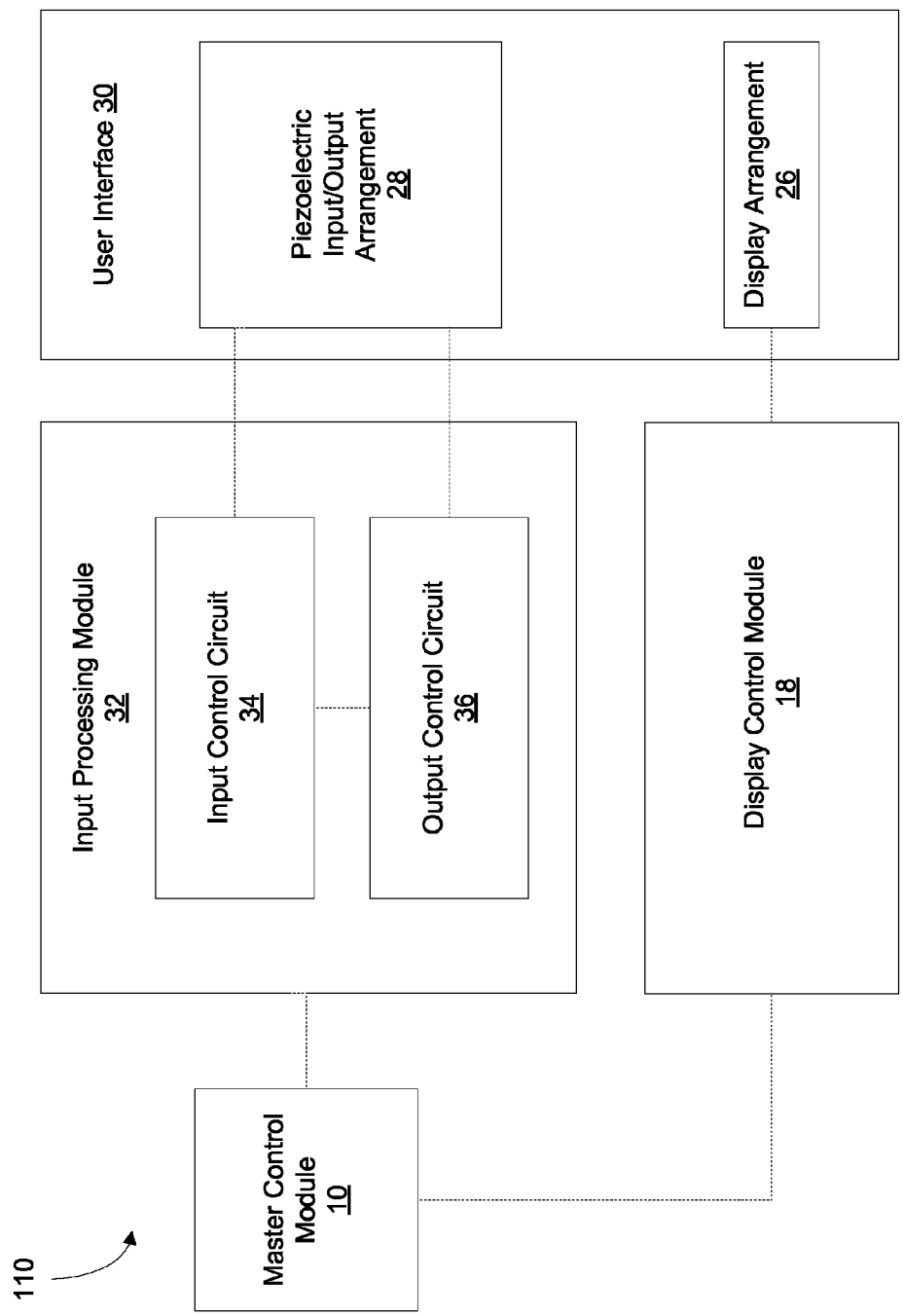
FIG. 2 is a block diagram that shows another arrangement for detecting user input according to an example embodiment of the present invention.

FIG. 2 is a block diagram that shows an arrangement 110 for detecting user input according to an example embodiment of the present invention. Similar to the arrangement 100, the arrangement 110 may include the master control module 10, the display control module 18 and the display arrangement 26. The arrangement 110 may also include an input processing module 32. Unlike the input processing module 12, an input control circuit 34 and an output control circuit 36 of the input processing module 32 may be coupled to the same user-interface component, e.g., a piezoelectric input/output (I/O) arrangement 28 of a user interface 30.

The I/O arrangement 28 may include a set of piezoelectric elements configured to receive the user input in addition to generating the haptic output. That is, a piezoelectric element may double as both a sensor and an actuator. When the piezoelectric element is operating as a sensor, the normal piezoelectric effect may be utilized. When the piezoelectric element is operating as an actuator, the inverse piezoelectric effect may be utilized. In this manner, a separate output arrangement, such as the haptic output arrangement 24 of FIG. 1, need not be included.

Exemplary embodiments of methods will now be described. The various methods described herein may be practiced, each alone, or in various combinations. In an example embodiment, the methods may be performed using dedicated hardware, e.g., the input processing modules 12/32. The methods may also be performed by supplying instructions to a non-dedicated processor of a computer, e.g., a main microprocessor executing instructions from multiple software applications. However, for performance reasons, dedicated hardware may be preferred.

Figure 3:
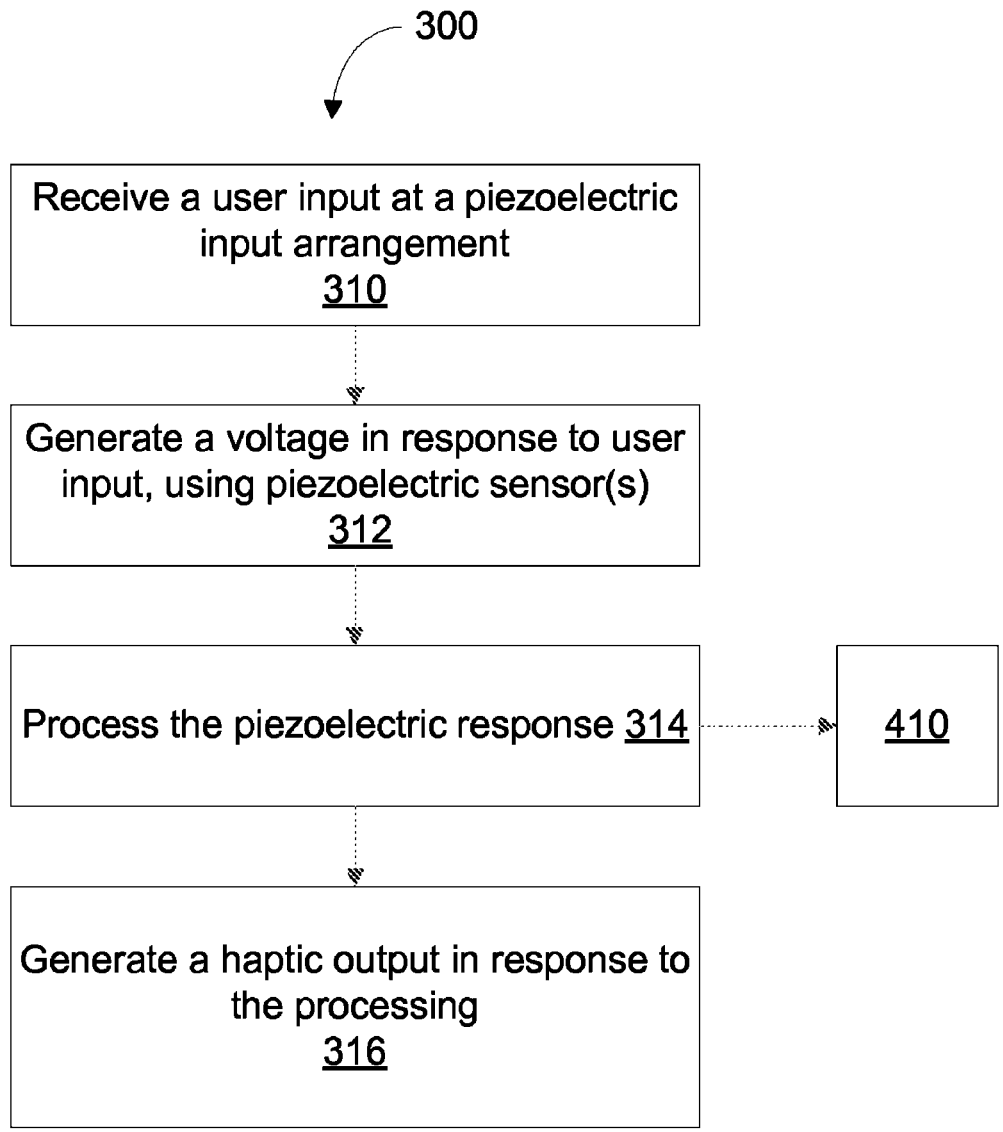
FIG. 3 is a flowchart that shows a method for detecting user input according to an example embodiment of the present invention.

FIG. 3 is a flowchart that shows a method 300 for detecting user input according to an example embodiment of the present invention. In step 310, the user input may be received at a piezoelectric input arrangement, e.g., the input arrangements 22/28. The user input may be any force-producing input that causes a deformation of at least one piezoelectric sensor of the input arrangement. For example, the user input may be a pressing of a touchscreen to which the input arrangement is mechanically coupled.

In step 312, a voltage may be generated by the at least one piezoelectric sensor in response to the user input. A separate voltage may be generated for each individual sensor of the input arrangement. If a plurality of piezoelectric sensors are utilized, the voltages will vary depending on the placement of each sensor in relation to the location of the user input. Sensors that are closer to the user input may generate a higher voltage than sensors located further away.

In step 314, the piezoelectric response to the user input may be processed by the input control circuit 14/34. The processing may indicate a location of the user input as well as a magnitude of the force of the user input. Results of the processing may be provided to the output arrangement 24/28 in substantially real-time, i.e., with normal circuit delay. The processing may involve analyzing electrical characteristics, e.g., voltage of the piezoelectric response.

In step 316, a haptic output may be generated by the output arrangement 24/28 in response to the processing. Characteristics of the haptic output may be determined by the output control circuit 16/36, which may, based on the processing, determine a duration, a location, a magnitude or a pulse pattern of the haptic output.

Figure 4:
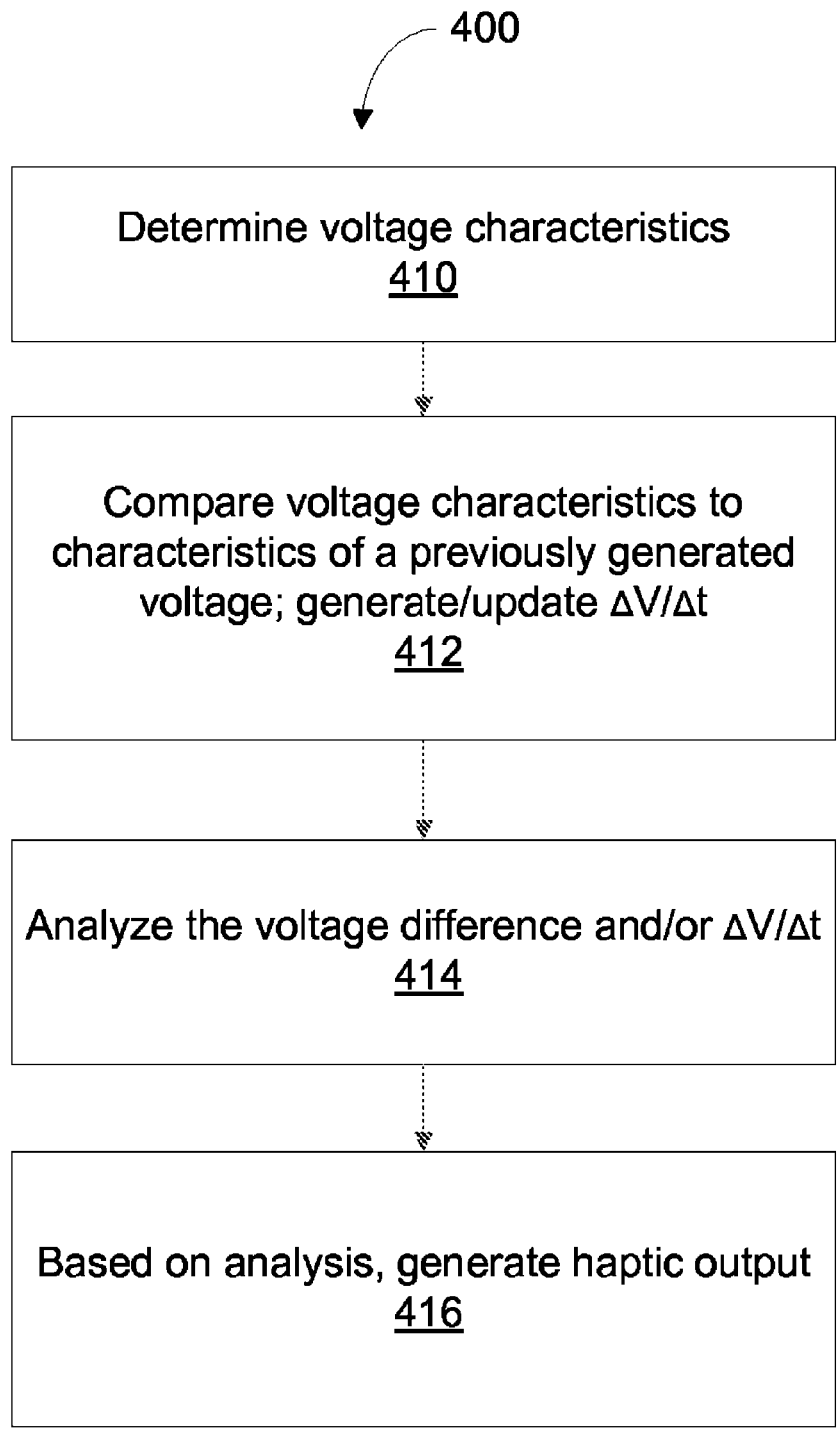
FIG. 4 is a flowchart that shows a method for analyzing user input according to an example embodiment of the present invention.

FIG. 4 is a flowchart that shows a method 400 for analyzing user input according to an example embodiment of the present invention. The method 400 begins at step 410, which corresponds to step 314 of the method 300. In step 410, voltage characteristics of the piezoelectric response may be determined by the output control circuit 16/36 after processing by the input control circuit 14/34. For example, the input control circuit 14/34 may perform signal processing including, but not limited to, filtering the voltage, comparing the voltage to a reference voltage and generating an amplified signal as a function of the comparison. In an example embodiment, the voltage characteristics may include a magnitude of the voltage and a sign of the voltage, i.e., positive or negative.

In step 412, the voltage characteristics may be compared to characteristics of a previously generated voltage, e.g., calculating a voltage difference, and a rate of voltage change $\Delta V/\Delta t$ may be generated as a result of the comparison. The previously generated voltage may have been stored in a memory, e.g., at the input control circuit 13/34, during a previous analysis. Alternatively, the previously generated voltage may be part of a set of voltages sampled and used solely in conjunction with a currently pending analysis.

In step 414, the voltage difference and/or $\Delta V/\Delta t$ may be analyzed at the input control circuit 14/34. The magnitude of the voltage difference may be mapped to corresponding haptic output characteristics. In an example embodiment, the voltage difference may be directly proportional to a magnitude of the haptic output, e.g., increasing vibration amplitude in proportion to the voltage difference. In particular, the voltage difference may be compared to a one or more threshold voltages associated with varying haptic output magnitudes. The output magnitudes may be organized as bands, with a first set of voltages mapped to a first band, a second set of voltages mapped to a second, higher band, etc. Each band may have a single output magnitude. $\Delta V/\Delta t$ may also be mapped to corresponding haptic output characteristics. For example, the frequency of the haptic output may be matched to $\Delta V/\Delta t$. In accordance with conventional control techniques, other mappings may also be possible.

In step 416, the haptic output may be generated based on the analysis, e.g., in accordance with the voltage difference and $\Delta V/\Delta t$ mappings described above. The haptic output may be generated by a piezoelectric motor or other output device at the output arrangement 24/28 in response to a control signal from the output control circuit 16/36.

Figure 5:
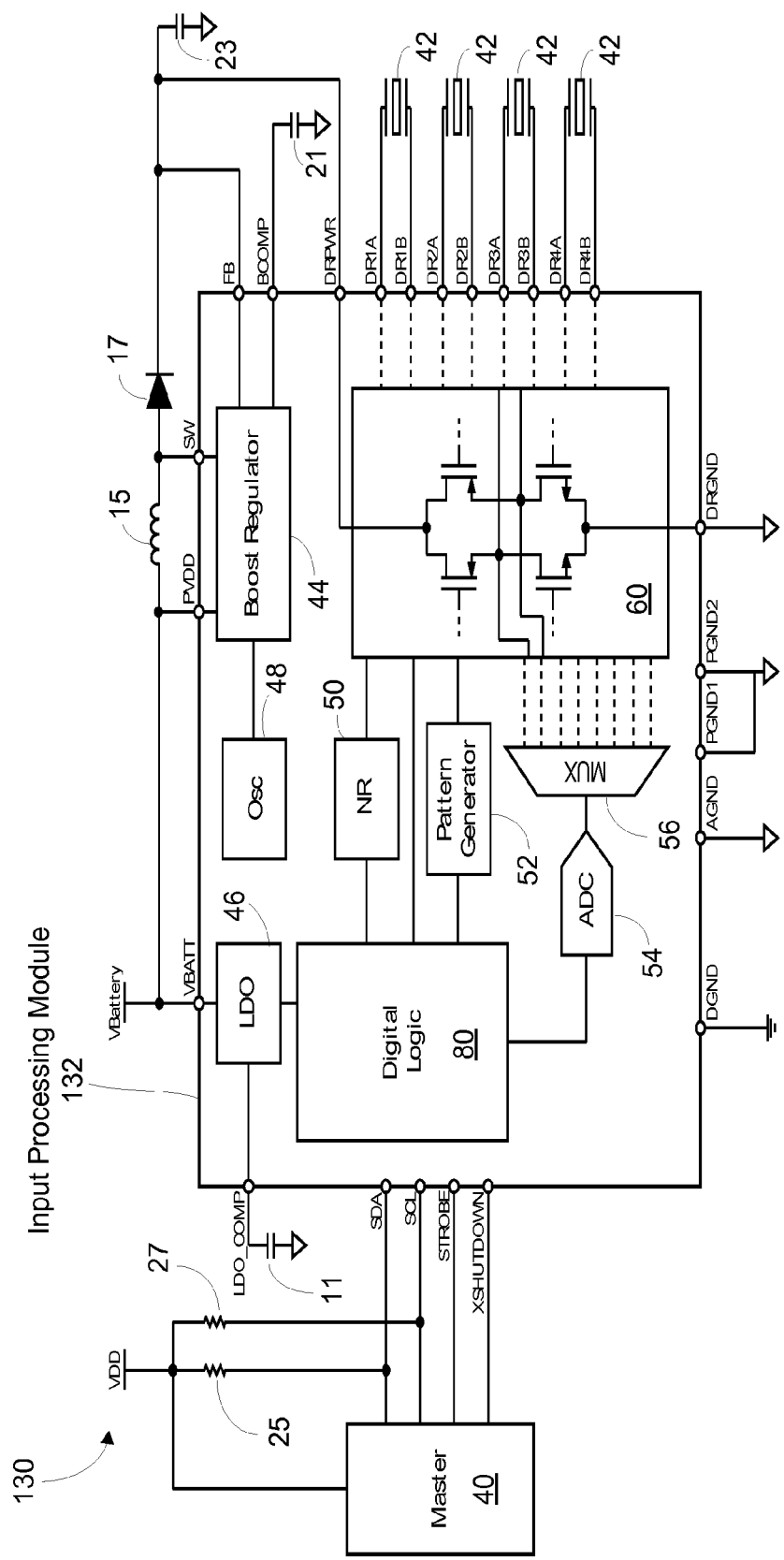
FIG. 5 is a circuit schematic of an arrangement for detecting user input according to an example embodiment of the present invention.

FIG. 5 is a circuit schematic of an arrangement 130 for detecting user input according to an example embodiment of the present invention. The arrangement 130 is a specific, hardware-based implementation of the arrangement 110 shown in FIG. 2 and includes a master control module 40, an input processing module 132, and a user interface that includes a plurality of piezoelectric elements 42.

The master control module 40 is connected to a supply voltage VDD and supplies a set of control signals to the input processing module 132. For example, an XSHUTDOWN signal may disable the input processing module 132 when the user device is placed in a sleep mode. A STROBE signal may selectively enable the output of the digital logic circuit 80 to turn various haptic outputs on and off. Bus lines corresponding to signals SCL and SDA may be provided for bi-directional communication between the master control module 40 and the input processing module 132. The control signals may be digital logic signals driven by the master control module 40. Depending on whether the default state of a control signal is logic-level high, a connection path between an output of the master control module 40 and the input processing module 132 may be optionally tied to VDD, e.g., via a resistor 25 or 27.

The piezoelectric elements 42 operate as dual sensor-actuators to receive the user input in addition to providing the haptic output. A single piezoelectric element 42 may be connected to an output driver circuitry or device, e.g., a piezoelectric driver. Alternatively, a plurality of output drivers may be provided, allowing for the independent driving of multiple piezoelectric elements 42, as shown in FIG. 5.

Figure 6:
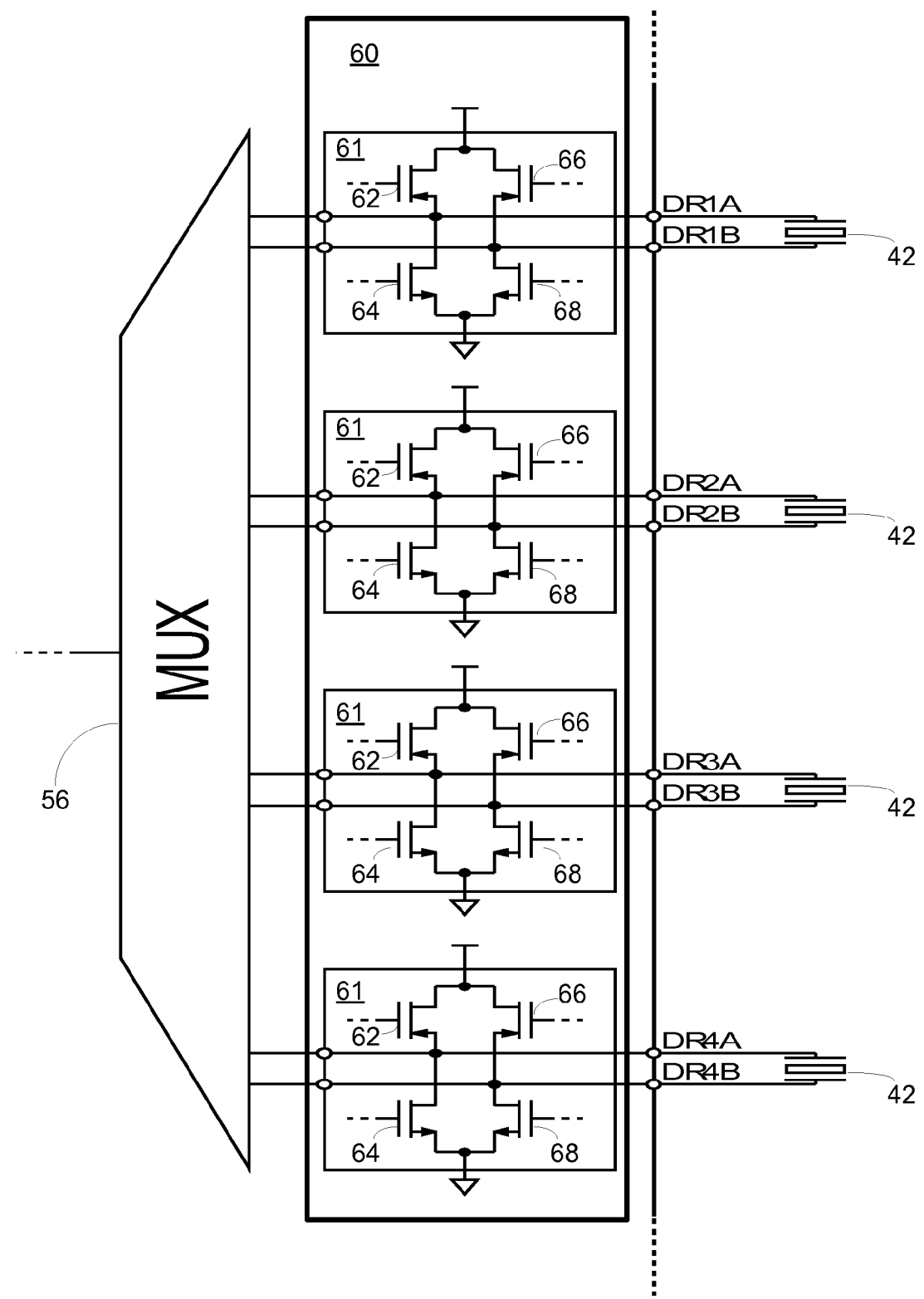
FIG. 6 is a circuit schematic of a set of device components in the arrangement of FIG. 5.

The input processing module 132 includes a digital logic circuit 80, a low-dropout regulator (LDO) 46, a boost regulator 44, an oscillator 48, a noise reducer (NR) 50, a pattern generator 52, an analog-to-digital converter (ADC) 54, a multiplexer (MUX) 56 and an I/O circuit 60. The MUX 56 and the I/O circuit 60 are shown in further detail in FIG. 6. An output of the MUX 56 is connected to the ADC 54, which is connected to the digital logic circuit 80. Inputs of the MUX 56 are connected to the I/O circuit 60. In particular, as FIG. 6 shows, the MUX inputs are organized as pairs, with each input pair being connected to a respective I/O cell 61 located in the I/O circuit 60.

Each I/O cell 61 includes a full-bridge circuit having a first transistor pair comprising an PMOS transistor 62 in combination with an NMOS transistor 64, and a second transistor pair comprising a PMOS transistor 66 in combination with an NMOS transistor 68. The first and the second transistor pairs collectively form a Class-D amplifier. Alternative embodiments may feature other types of amplifiers, e.g., Class A, Class B or Class AB amplifiers. The gates of the transistors 62/64/66/68 are connected to the digital logic circuit 80 via the pattern generator 52. Drain terminals of the PMOS transistors 62/66 are connected to a supply voltage DRPWR, while source terminals of the NMOS transistors 64/68 are connected to a ground voltage DRGND. A drain terminal of each NMOS transistor 64/68 is connected to a source terminal of the corresponding PMOS transistor 62/66. Each of these source-drain connections is connected to a respective terminal of a piezoelectric element 42. The source-drain connections are further connected as inputs to the MUX 56. In particular, the source-drain connection of the transistors 62/64 is connected as a first input of an input pair, while the source-drain connection of the transistors 66/68 is connected as the other input of the input pair. As explained below, the source-drain connections may be used for passing the voltage generated by the piezoelectric elements 42 to the MUX 56, in addition to providing a driving signal for the haptic output.

In addition, although the I/O cell 61 is implemented with a full-bridge circuit, it may also be possible to utilize other types of amplifier circuits, such as a half-bridge circuit. In an alternative embodiment, a half-bridge circuit may drive a single terminal of a piezoelectric element 42 to generate the haptic output.

The digital logic circuit 80 is powered via a connection to the LDO 46, which is in turn powered by a supply voltage VBattery and connected to a ground voltage via a DC-blocking capacitor 11. An input of the digital logic circuit 80 is connected to the output of the ADC 54. Outputs of the digital logic circuit 80 are connected to the I/O circuit 60 via the NR 50 and via the pattern generator 52. Other connections may exist between the digital logic circuit 80 and the I/O circuit 60, for example, a write signal on a bus for controlling a logic state of the I/O circuit 60. However, it may also be possible to drive the I/O circuit 60 to actuate the piezoelectric elements 42 or other output devices, using other output driver types. Thus, in an alternative embodiment, the interface between the digital logic circuit 80 and the I/O circuit 60 need not be a bus, but could instead include a simple pattern-in and pattern-out interface for enabling the haptic output.

The NR 50 is a circuit that selectively reduces the level of acoustic noise generated by the piezoelectric elements 42 in response to the user input.

The output of the oscillator 48 is connected to the boost regulator 44, which is connected to a ground voltage via a DC-blocking capacitor 21. The boost regulator 44 is further connected to both terminals of an inductor 15. A first terminal of the inductor 15 is connected to VBattery and the other inductor terminal is connected to a diode 17. The boost regulator 44 operates to increase the voltage supplied by VBattery, outputting a stepped-up voltage as the supply voltage to the PMOS transistors 62/66. The stepped-up voltage may be any voltage sufficient to drive the piezoelectric elements 42. A connection between the output of the boost converter 44 and the PMOS transistors 62/66 may also be connected to a ground voltage via a DC-blocking capacitor 23. It will be understood that the power supply configuration shown in FIG. 5 is merely illustrative, and may varying depending on the power requirements of a particular implementation. For example, in other embodiments, the voltage requirements of the piezoelectric elements 42 may be such that a boost regulator is unnecessary.

Referring to FIGS. 5 and 6, the arrangement 130 operates as follows. User input causes one or more piezoelectric elements 42 to generate a voltage across the terminals thereof. The voltage is directly input to the MUX 56 via the source-drain connections of the transistor pairs 62/64 and 66/68, to which the input pairs of the MUX 56 are connected. The MUX 56 receives the voltage(s) as input, then outputs an analog signal to the ADC 54 as a function of the voltage(s), which are proportional to the force applied by the human or other operator. The analog signal is converted by the ADC 54 into a digital signal, which is supplied to the digital logic circuit 80. The digital signal is processed, e.g., analyzed according to the method 400, and the digital logic circuit 80 controls the pattern generator 52 to produce a control signal having a digital pattern. The control signal is supplied to the gate inputs of the transistors 62/64/66/68, generating a voltage across the source-drain connections, which results in an application of the inverse piezoelectric effect upon one or more of the piezoelectric elements 42. An output device is actuated by the piezoelectric elements 42 to generate a haptic output that corresponds to the user input.

In the example embodiments above, the piezoelectric elements 42 are connected to the I/O cells 61 via a pair of connections used to both transmit the user input as a voltage to the MUX 56, as well as to receive a driving voltage to generate the haptic output. In an alternative embodiment, the piezoelectric elements 42 may have four connections; two for transmitting the user input (e.g., directly to a MUX), and two for receiving the driving voltage (e.g., from a Class-D amplifier). In another alternative embodiment, the number of connections may be the same as previously described, i.e., two connections, but only one connection may be used to transmit the user input, e.g., via a half-bridge circuit, while the other connection is used to receive the driving voltage. In yet another embodiment, a single connection may be used to drive the piezoelectric elements 42 via a half-bridge circuit, as well as to transmit the user input via a source-drain connection, as described in reference to the full-bridge circuit of FIG. 6. Where a single connection is used, the other terminal of the piezoelectric elements 42 may be tied to a ground voltage. Thus, the number of connections to the piezoelectric elements 42 may vary.

Figure 7:
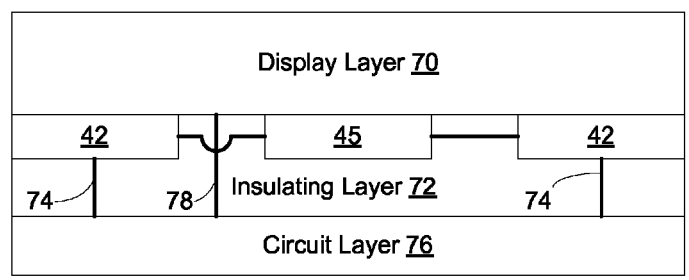
FIG. 7 is a cross-sectional view of a device for detecting user input according to an example embodiment of the present invention.

FIG. 7 is a cross-sectional view of a device for detecting user input according to an example embodiment of the present invention. The device may include a display layer 70, an insulating layer 72 and a circuit layer 76. The display layer 70 may be a glass or plastic surface for receiving the user input. The display layer 70 may include display elements such as liquid crystals or light-emitting diodes. The display elements are connected to the circuit layer 76 via one or more connections 78.

Piezoelectric elements 42 may be located below the display layer 70 and mechanically coupled to the display layer 70 to receive the user input. The piezoelectric elements 42 may be embedded in the insulating layer 72 and electrically coupled to the circuit layer 76 via one or more connections 74. For example, the connections 74 may represent the configuration shown in FIG. 6, in which each piezoelectric element 42 has two connections to the I/O cell 61. The piezoelectric elements 42 may further be connected to an output device such as a motor 45. The piezoelectric elements 42 may be connected to a single output device, as shown. Alternatively, a plurality of output devices may be provided, each output device being selectively connected to the piezoelectric elements 42 so as to produce a localized haptic output. For example, a piezoelectric motor 45 may be included in each of the four corners of the device. The circuit layer 76 may include circuits for controlling the display of images at the display layer 70, as well as circuits for controlling the receiving of the user input and the generating of a responsive haptic output. For example, the arrangements 100/110 of FIGS. 1 and 2 may be located in the circuit layer 76.

Figures 8, 9:
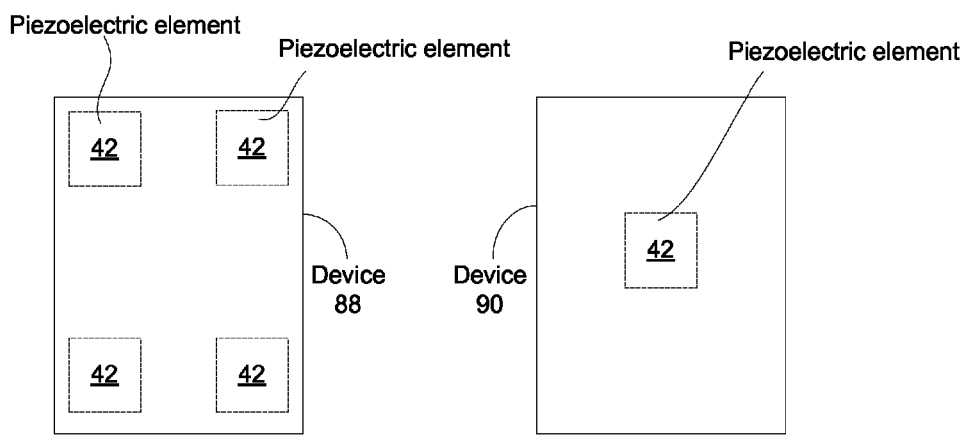
FIG. 8 is a top view of a device for detecting user input according to an example embodiment of the present invention.
FIG. 9 is a top view of another device for detecting user input according to an example embodiment of the present invention.

FIG. 8 is a top view of a device 88 for detecting user input according to an example embodiment of the present invention. As shown, piezoelectric elements 42 are located in each of the four corners of the device 88. In this configuration, the voltages generated by the piezoelectric elements 42 may be used to determine where the user input is located. For example, the voltages may be inversely proportional to the distance between the user input and the piezoelectric element 42, so the location of the user input can be calculated using the two or more voltages. Haptic output may then be generated in response to the user input. For example, if a motor is provided at each of the four corners, the motor(s) closest to the user input may be activated.

FIG. 9 is a top view of a device 90 for detecting user input according to an example embodiment of the present invention. Unlike the device 88, only a single piezoelectric element 42 is included. The piezoelectric element 42 may be selected based on sensitivity so that, depending on the types of applications for which the device 90 is used, the piezoelectric element 42 may have a relatively small detection range, e.g., about a central region of the device 90, or a large detection range, e.g., across the entire surface of the device 90. The piezoelectric element 42 may also be connected to one or more output devices to generate the haptic output.

The arrangements of the piezoelectric elements 42 as shown in FIGS. 8 and 9 are illustrative rather than exclusive. Although the embodiments described feature arrangements of one or four piezoelectric elements 42, the total number of elements may vary depending on the requirements of the user device and/or the software applications running on the user device. Thus, in an alternative embodiment, the number of piezoelectric elements 42 used in the input arrangement 22/28 may vary as a function of the number of keys or buttons in the user interface. For example, there may be one piezoelectric element 42 per key/button. Alternatively, there may be a plurality of piezoelectric elements 42 per key/button, e.g., when a surface area of each key is large enough to accommodate more than one element 42.

The exemplary embodiments of the present invention provide for an improved feedback response compared to conventional user interface technologies, such as capacitive, resistive or hybrid capacitive-resistive touchscreens. In the conventional user interfaces, user input often requires a substantial amount of processing, e.g., through a software stack, before the characteristics of the user input can be determined. Recognizing the presence of the user input, e.g., screen location, may require a substantial amount of time. Determining the magnitude of the force of the user input may require any even greater amount of time. Consequently, latency between when the user input is received and when an output device is activated often exceeds 100 milliseconds. From the user's perspective, this be an unacceptable delay resulting in a sensory disconnect, e.g., between the sensation of touching the user interface and the sensation of the responsive output. In an extreme case, a haptic output may not be generated until an input source, e.g., the user's finger, is no longer in contact with the touchscreen, in which case the user may not receive any tactile feedback.

In contrast, the present invention reduces latency to a more optimal level, e.g., on the order of 10 milliseconds. Because the user input is not processed through a software stack before an output is sent, response time is improved. The piezoelectric elements 42 enable haptic output as a direct consequence of the voltages generated at the piezoelectric elements 42. Using the voltages, a haptic driver, e.g., the input processing module 132, may determine that a touch event is occurring and determine the magnitude of the force applied during the touch. The force may be compared to hardwired or programmed references, e.g., voltage references, and an appropriate control signal may be output to the piezoelectric elements 42, or to a separate actuator.

The improved response time provided by the present invention may facilitate new applications of touch inputs and corresponding responses. In one example application, the user may program a touch password by inputting a specific sequence, at a specific location, with specific a timing interval. The touch password may be used to lock or unlock the user device. In another example application, the user may customize a haptic or other response by recording the force and timing of a touch, then selecting an appropriate output to be generated when the same input is subsequently applied. Accordingly, the response may be selected to achieve a degree of specificity, e.g., location, pattern, image, timing, etc., sufficient to enable the user to distinguish the input from other inputs. Thus, a light touch may produce a different response than a hard touch. Responses may also be context-specific, so that the same input may produce different responses depending on context, e.g., varying responses across different software applications.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and appendices.

What is claimed is:

1. A method of detecting a force-producing input from a user and providing a user-customizable haptic output, comprising:
   receiving the input at an input arrangement of a user interface, the input arrangement having at least one piezoelectric sensor;
   generating, at the at least one piezoelectric sensor, an electric signal in response to the input;
   processing the electric signal to determine a presence of the input, the processing including determining at least one of a voltage difference between a current signal sample and a previous signal sample and a rate of voltage change from the previous signal sample to the current signal sample;
   recording a force and a timing interval of the input;
   receiving a user selection of a haptic output to be generated in response to future instances of receiving the same input with a force and timing equivalent to the recorded force and the timing interval of the input; and
   generating, at an output arrangement of the user interface, the haptic output in response to a processing of an electric signal generated in response to receiving the same input with a force and timing equivalent to the recorded force and the timing interval of the input.

2. The method of claim 1, wherein the processing determines a magnitude of the force.

3. The method of claim 2, wherein the processing includes determining at least one of a voltage difference between the current signal sample and the previous signal sample, the method further comprising:
   setting a magnitude of the output by mapping the determined voltage difference to the magnitude.

4. The method of claim 3, wherein possible values for the magnitude of the output are organized into bands, with a plurality of determined voltage difference values mapped to each band.

5. The method of claim 1, wherein the haptic output is generated using a piezoelectric actuator separate from any piezoelectric sensor of the input arrangement.

6. The method of claim 1, wherein the haptic output is generated using the at least one piezoelectric sensor.

7. The method of claim 1, wherein the input arrangement includes a plurality of mapped locations and the processing determines which of the plurality of mapped locations corresponds to a location of the input.

8. The method of claim 1, wherein the haptic output is output together with one of an audio and a visual output.

9. The method of claim 1, wherein the input arrangement has four piezoelectric sensors.

10. The method of claim 1, wherein one piezoelectric sensor is included in the input arrangement: (i) per each key provided in the user interface; and (ii) per each button provided in the user interface.

11. The method of claim 1, wherein the processing includes determining the rate of voltage change from the previous signal sample to the current signal sample, the method further comprising:

setting a frequency of the output by mapping the determined rate of voltage change to the frequency.

12. The method of claim 1, further comprising:
programming a touch-based password based on a plurality of user inputs, as a function of an order of the user inputs, respective locations of each user input, and a timing of each user input.

13. A device for detecting a force-producing input from a user and providing a user-customizable haptic output, comprising:
a user interface including:
an input arrangement having at least one piezoelectric sensor configured to generate an electric signal in response to the input, and
an output arrangement; and
a control module receiving the electric signal, the control module configured to:
record a force and a timing interval of the input;
receive a user selection of a haptic output to be generated in response to future instances of receiving the same input with a force and timing equivalent to the recorded force and the timing interval of the input; and
process the electric signal, thereby determining the presence of the input, the processing including determining at least one of a voltage difference between a current signal sample and a previous signal sample and a rate of voltage change from the previous signal sample to the current signal sample,
wherein the output arrangement is configured to generate the haptic output in response to a processing, by the control module, of an electric signal generated in response to receiving the same input with a force and timing equivalent to the recorded force and the timing interval of the input.

14. The device of claim 13, wherein the processing determines a magnitude of the force.

15. The device of claim 13, wherein the haptic output is generated using a piezoelectric actuator separate from any piezoelectric sensor of the input arrangement.

16. The device of claim 13, wherein the haptic output is generated by the at least one piezoelectric sensor.

17. The device of claim 13, wherein the input arrangement includes a plurality of mapped locations and the processing determines which of the plurality of mapped locations corresponds to a location of the input.

18. The device of claim 13, wherein the output arrangement is configured to provide one of an audio output and a visual output together with the haptic output.

19. The device of claim 13, wherein the input arrangement has four piezoelectric sensors.

20. The device of claim 13, wherein one piezoelectric sensor is included in the input arrangement: (i) per each key provided in the user interface; and (ii) per each button provided in the user interface.

21. A control module configured to detect a force-producing input from a user and provide a user-customizable haptic output by:
receiving an electric signal from at least one piezoelectric sensor located at an input arrangement of a user interface, the electric signal being generated in response to the input;
processing the electric signal to determine the presence of the input, the processing including determining at least one of a voltage difference between a current signal sample and a previous signal sample and a rate of voltage change from the previous signal sample to the current signal sample;
recording a force and a timing interval of the input;
receiving a user selection of a haptic output to be generated in response to future instances of receiving the same input with a force and timing equivalent to the recorded force and the timing interval of the input; and
controlling an output arrangement of the user interface to generate the haptic output in response to a processing, by the control module, of an electric signal generated in response to receiving the same input with a force and timing equivalent to the recorded force and the timing interval of the input.

* * * * *